United States Patent
Shen et al.

(10) Patent No.: US 7,969,685 B2
(45) Date of Patent: Jun. 28, 2011

(54) ABS DESIGN FOR DYNAMIC FLYING HEIGHT (DFH) APPLICATIONS

(75) Inventors: Xinjiang Shen, Fremont, CA (US); Zhu Feng, Pleasanton, CA (US); Ellis Cha, San Ramon, CA (US); Robert Chu, San Jose, CA (US)

(73) Assignee: SAE Magnetics (HK) Ltd., Shatin, N.T. (HK)

( * ) Notice: Subject to any disclaimer, the term of this patent is extended or adjusted under 35 U.S.C. 154(b) by 521 days.

(21) Appl. No.: 12/228,496

(22) Filed: Aug. 13, 2008

(65) Prior Publication Data
US 2010/0039732 A1  Feb. 18, 2010

(51) Int. Cl.
*G11B 5/147* (2006.01)
(52) U.S. Cl. .................................. 360/125.31
(58) Field of Classification Search ............... 360/235.5
See application file for complete search history.

(56) References Cited

U.S. PATENT DOCUMENTS

| | | | |
|---|---|---|---|
| 7,006,336 B2 * | 2/2006 | Coffey et al. ............... 360/313 |
| 7,027,248 B2 * | 4/2006 | Hamaguchi et al. ........... 360/59 |
| 7,068,457 B2 | 6/2006 | Riddering et al. |
| 7,133,254 B2 * | 11/2006 | Hamann et al. .......... 360/125.74 |
| 7,164,555 B2 * | 1/2007 | Kato et al. .................... 360/128 |
| 7,372,665 B1 * | 5/2008 | Stoev et al. .............. 360/125.33 |
| 7,545,595 B2 * | 6/2009 | Hamaguchi et al. ............ 360/59 |
| 7,595,960 B2 * | 9/2009 | Shimizu et al. ............ 360/234.5 |
| 7,684,153 B2 * | 3/2010 | Ohtsu et al. ................ 360/234.5 |
| 7,729,086 B1 * | 6/2010 | Song et al. ................ 360/125.31 |
| 2003/0128469 A1 | 7/2003 | Pust et al. |
| 2006/0092570 A1 | 5/2006 | Payne et al. |
| 2006/0139810 A1 | 6/2006 | Hashimoto et al. |
| 2007/0058296 A1 | 3/2007 | Hashimoto et al. |

* cited by examiner

*Primary Examiner* — Mark Blouin
(74) *Attorney, Agent, or Firm* — Salie Ackerman LLC; Stephen B. Ackerman

(57) ABSTRACT

A DFH (Dynamic Flying Height) type slider ABS design has a stable flying height and a DFH efficiency that is uniform across the entire disk surface. These properties are a result of embedding the read/write head and heater in a trapezoidally bridged micro-pad having a very small surface area. The micro-pad is surrounded by a wing-like structure that projects from a central rail in the ABS and the micro pad is connected to an inner edge of that structure by a bridge having a trapezoidal shape. The trapezoidal shape responds effectively to variations in air flow direction and pressure point as the slider moves across the disk surface and, as a result, provides the uniform DFH efficiency. At the same time, the projecting wings and adjacent topology help to direct the airflow around the micro-pad and provide the stable flying height.

12 Claims, 3 Drawing Sheets

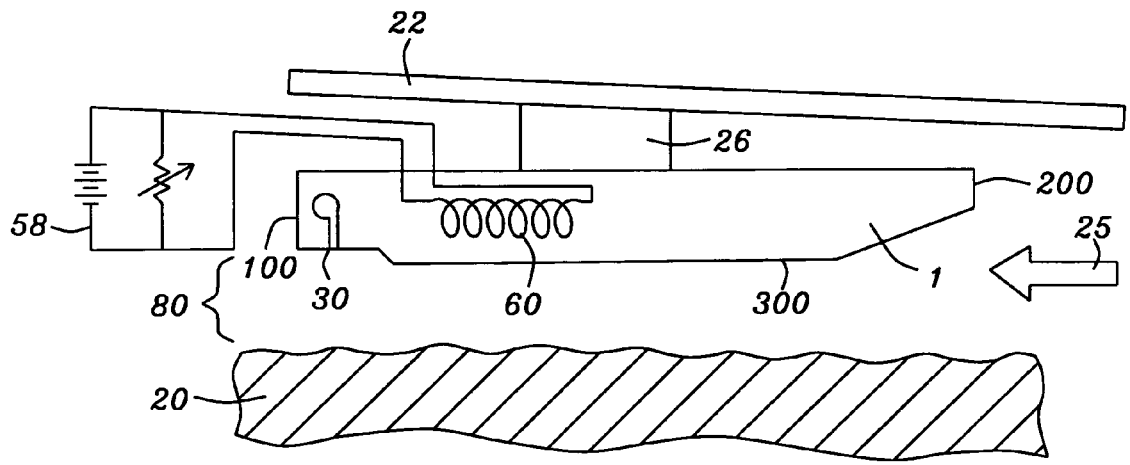
FIG. 1 – Prior Art
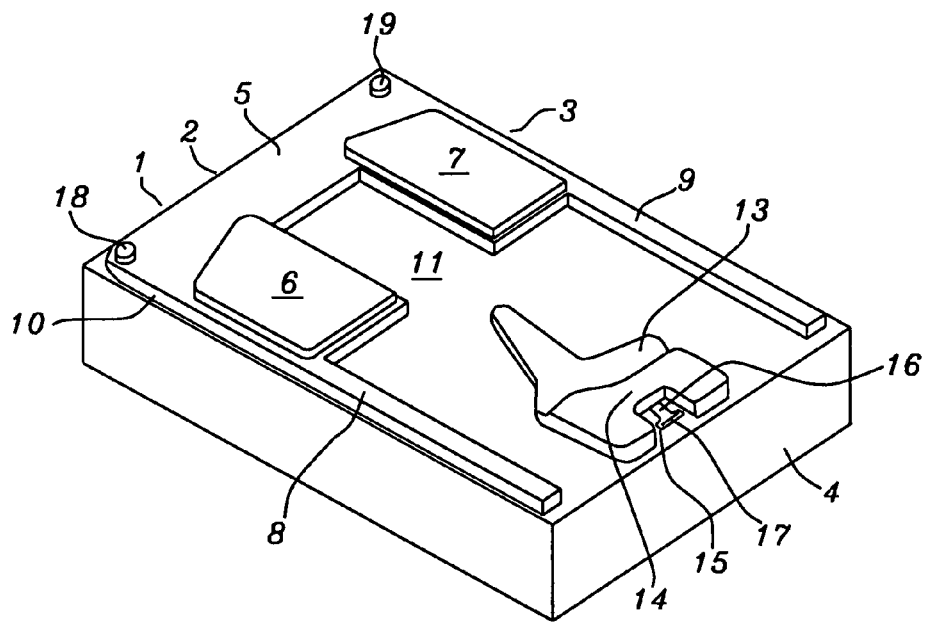
FIG. 2 – Prior Art

ABS DESIGN FOR DYNAMIC FLYING HEIGHT (DFH) APPLICATIONS

BACKGROUND OF THE INVENTION

1. Field of the Invention

This invention relates to the fabrication of thin film magnetic read/write heads and particularly to a method for forming a DFH (Dynamic Flying Height) slider to achieve high DFH efficiency that is uniform across a disk surface, stable aerodynamics and minimum variations of flying height under a wide range of conditions.

2. Description of the Related Art

FIG. 1 is a highly schematic and simplified illustration showing a read/write head (30) mounted in a DFH slider (1) in operation over a spinning disk (20) in a hard disk drive (HDD). The slider is a ceramic structure with a smooth, planar surface (300), called its ABS (air bearing surface) that is supported over a rapidly spinning disk by aerodynamic forces produced a flow of air between the slider and the disk (25). The slider is attached by a flexible member (26) to an arm (22) called the head gimbals assembly. The height above the disk at which the slider maintains its position while the disk is rotating is called its flying height (80). The rotation of the disk relative to the slider is in the same direction as the airflow, shown by an arrow (25). The edge of the slider into which the disk rotates (200) is called the "leading edge" of the slider, while the opposite edge (100) is called the "trailing edge." The read/write head, also called a transducer (30) is mounted near the trailing edge of the slider. In a DFH type slider, heating coils (60) are embedded in the slider adjacent to the read/write head. The purpose of these coils is to heat the slider in the region around the read/write head and cause a thermal protrusion of the slider in that region so that the read/write head can be made to approach the surface of the disk more closely. This provides a mechanism for controlling the flying height dynamically, i.e., while the disk is actually in motion. These coils are controlled by external circuitry (58). As will be seen from the discussion below, this thermal control of the flying height can be accompanied by some problems.

FIG. 2, taken substantially from Hashimoto et al., (US Published Patent Application 2007/0058296), shows, in more detail, the surface topography of a commercially available (prior art) slider. Like the slider of FIG. 1, this slider is provided with thermal control of its flying height (i.e., it is a dynamic flying height slider) for use in a hard disk drive (HDD) as discussed above. Some features of this slider are worth noting.

The slider (1) has a pre-patterned air-bearing surface (ABS) plane (3) that faces the rotating disk during HDD operation. Although the ABS plane is substantially planar, as indicated in FIG. 1, FIG. 2 shows that it actually has a patterned topography, including outward projecting pads (10), (12), rails (8) (9) and incised grooves (11), (15) which extend into and out of the body of the slider vertically away from the surface plane. This slider, as the one in FIG. 1, is typically mounted on the distal end of a head gimbal assembly (HGA) (not shown here) that is activated by an electromechanical mechanism and control circuitry to position the head at various positions along the magnetic tracks on the disk (not shown).

The leading edge of this slider is labeled (2), the opposite trailing edge, which contains the read/write head, is labeled (4). The read/write head (17) is encapsulated within the slider at its trailing edge in a "rear pad" (12) and, as we shall see below, in the dynamic flying height (DFH) type slider, such as illustrated in FIG. 1, the read/write head is also surrounded by, or adjacent to, embedded heating elements (not shown here). The slider topography also includes airflow grooves (11) that are etched into the slider surface to provide an enhanced aerodynamic performance. The aerodynamics of the slider motion lifts the leading edge higher above the rotating disk surface than the trailing edge.

For a typical disk drive (approx. 200 Gbyte/platter) the flying height distance (80) between the magnetic head and the media is between approximately 10 nm (nanometers). It is essential that the sliders fly with aerodynamic stability over the disk surfaces during reading and writing.

Currently, the distance between the slider and the media has been pushed to as low as 5 nm during read processes via the dynamic flying height (DFH) technology, which is exemplified by the slider in FIG. 2. This technology is also described, for example, in Hashimoto et al. (US Published Patent Application 2006/0139810), Kato et al, (U.S. Pat. No. 7,164,555), Payne et al. (US Published Patent Application 2006/0092570), Riddering et al. and (U.S. Pat. No. 7,068, 457). Pust et al. (US Published Patent Application 2003/0128469) shows bonding pads and studs that reduce thermal deformation.

As already noted, DFH technology achieves local flying height reduction by applying a voltage to a heater embedded in the slider body. Heat supplied by the heater increases the temperature of the slider in the heater's vicinity and this increase in temperature, in turn, causes the surface of the slider to protrude as a result of thermal expansion of the surrounding material. In principle, this protrusion will bring the read/write head closer to the disk surface, thus reducing the flying height and allowing for greater resolution in the read/write process.

During the resulting temperature induced protrusion process, however, the slider will be pushed back by a protrusion-induced increase in the air pressure acting on the slider due to the squeezed layer of air within the head/disk interface. This additional air pressure acts counter to the desired flying height reduction that the heater-induced slider protrusion is meant to produce. Thus it is highly desirable to provide a method of decreasing flying height by a thermal process, while not allowing that very decrease to counter the desired effect.

In DFH technology, the heater is turned on only when a read or write operation is called for. This substantially improves the reliability of the head/disk interaction for the following reasons: 1) the magnetic head does not have to constantly fly at low flying heights; 2) the magnitude of flying height reduction can be made to depend on the environmental conditions, for example a smaller height reduction is required at high temperatures and high altitudes; 3) the flying height minimum point is always at the heater area, the other areas of potential contact are always higher and, therefore, the opportunities for contact are reduced; 4) even if there is a contact at the heater area, the contact force is smaller due to the reduced area of contact and, therefore, there is less chance of creating head modulation and related read/write failure.

The various processes cited above have created the following meaningful challenges for slider design in DFH applications. The following three challenges, denoted A, B, and C, are associated with the design of the air bearing surface.

A. Very High Pressure is Applied on the Heated Area of the Slider.

This produces what is called "pushback" or ABS (air-bearing surface) compensation, which is the counterproductive effect of preventing the local deformations of the slider body that are required to produce good DFH efficiency. The DFH efficiency is defined as the ratio of the actual flying height reduction to the slider body protrusion height (or, equivalently, to heater power). If the protrusion produced by a given input of heater power is negated by the added pressure pushing the slider away from the disk surface, then the effects have canceled each other and more heater power is required to accomplish a given flying height reduction. One approach to mitigating this problem is, therefore, to simply apply higher power to the heater. Unfortunately, over long term operation this can either degrade the reader performance or cause excessive power consumption or both. Alternatively, to further improve the DFH efficiency of air bearing sliders for DFH applications, traditional designs attempt to reduce the pressure acting on the entire slider body. This approach sacrifices the flying height sigma, i.e., the tight control over statistical variations in flying height for a set of sliders.

B. Large Disk Distortion at the Inner Radius.

Disks usually have large distortions under disk clamping forces. This produces an undulating disk surface and a large flying height variation between the slider and the disk across the disk surface. This distortion is more pronounced at the inner diameter (ID) than the outer diameter (OD). This creates yet another challenge to achieving a stable flying height across the entire disk surface. Lowering the pressure at the area where the magnetic sensor is carried will significantly increase the sensitivity to local disk distortions at the inner radius.

C. DFH Variations Across the Disk Radius.

For traditional air bearing surface designs the DFH efficiency usually varies across the disk radius. At the inner diameter (ID) the DFH efficiency is usually greater than it is at the middle of the disk (MD) or at the outer portion of the disk (OD). This is because air flow at the ID is not as strong as it is at the MD and OD. The pushback of the slider due to air squeezing at the ID is smaller, therefore, the DFH efficiency is higher at the ID.

The following three challenges, denoted A, B, and C, are a result of the specific requirements of consumer electronics.

A. Temperature Requirements.

Consumer electronics devices are required to operate within the large range of temperatures between −20° C. and +80° C. The flying height between the magnetic head and the media surfaces can change due to mechanical changes in the system resulting from the temperature variations. For example, the static pitch altitude (PSA) of the head gimbal assembly (HGA) can change and, additionally, the temperature variations can create changes in the shape of the slider crown. It is therefore desirable that an ABS design can be able to compensate for flying height changes due to changes in the slider shape.

B. Altitude Requirement.

Consumer electronics devices are usually required to operate at an altitude of 10,000 ft. Since the air density at such an altitude is much lower than that at sea level, the high altitude has a direct impact on the flying height between the magnetic head and the media. It is therefore desirable to have a slider ABS design that minimizes the flying height changes due to high altitude.

C. Power Requirements.

Consumer electronics devices also have a limitation on the amount of power that can be used during drive operations. Higher DFH efficiency will reduce the power necessary to achieve the necessary flying height to read and write.

Different approaches have been suggested for achieving higher DFH efficiency. One approach is via ABS design. Hashimoto et al., cited above with reference to FIG. 2 and Hashimoto et al. also in U.S. Patent Application 2006/0139810, describes an isolated ABS pad ((12) in FIG. 2) for achieving flying height control by DFH. The operation of the pad is to reduce the push back effect caused by protrusion by moving the pressure peak on the ABS from the pad itself to a position on the ABS surrounding the pad.

Since the ABS pressure at such an isolated pad is small, a large deformation/protrusion can be achieved at low heater power, thereby producing a high DFH efficiency. However, this design could lead to instability or modulation of the head due to the separation between the read/write pad and the main air bearing pressure center. For that reason and others, the present invention proposes a bridged area to provide pushback on the read/write head area.

It is the view of the present inventors that none of the aforementioned approaches will achieve the stable and controllable DFH slider dynamics and improved DFH efficiency of the present invention as defined by the following objects and method of achieving them.

SUMMARY OF THE INVENTION

It is a first object of this invention to improve the DFH efficiency of a slider.

It is a second object of this invention to improve the DFH efficiency of a slider while maintaining its aerodynamic stability.

It is a third object of this invention to maintain the aerodynamic stability of a DFH slider over a wide range of conditions imposed upon it due to the requirements of consumer electronics such a altitude ranges, power consumption and temperature changes.

It is a fourth object of this invention to minimize sensitivity of the flying height of the DFH slider to surface variations of a rotating disk.

It is a fifth object of the present invention to increase the reliability of disk drives by enabling a uniform relationship between touchdown power and power required to maintain a uniform and desirable flying height.

It is a sixth object of this invention to obtain the above objects by means of a new ABS design that provides high DFH efficiency compared with prior art designs.

It is a seventh object of this invention to achieve the above objects while avoiding the risk of flying height modulations during HDD operation.

It is an eighth object of this invention to minimize the sensitivity of DFH efficiency to disk radius for both the read and write processes, especially for high RPM 3.5 inch drives. The DFH efficiency for the present invention is uniform at different disk radii.

These objects will be met by two new ABS design embodiments that are schematically illustrated in FIG. 3A and FIG. 3B, each in a detailed plane view. Each design incorporates a micro-pad in which is embedded a read/write head and adjacent heating elements that will provide the DFH control. The micro-pad is partially surrounded (laterally and to its leading edge side) by a centrally symmetric structure from which two wings project. Although the micro-pad is substantially separated from the trailing edge side of this structure by a trench, a centrally located bridge connects the micro-pad to the structure. The two embodiments differ in the shape of the bridge, with the first embodiment incorporating a rectangular bridge and the second embodiment incorporating a trapezoidal bridge (a rectangular portion which flares out). It will be shown that these two shapes produce different behaviors of the sliders.

Although the general bridged design is more effective at achieving the objects of the invention than prior art designs, it was noted that the design tended to produce a non-uniform DFH efficiency as the slider moved radially across the surface of a disk from its inner radius (ID) to its outer radius (OD). This non-uniformity is caused by the fact that the location of the pressure center relative to the read/write head position in the slider changes drastically with skew angle. Referring to FIG. 4, there is shown a graphical representation of this variation of DFH efficiency with disk radius. At the ID, where there are high skew angles between the air flow and the slider, the DFH efficiency is much higher than at the MD or OD. This is because the push back air bearing pressure at the magnetic sensor area changes dramatically from ID to OD. In particular, the push back pressure at the ID is much smaller than at either the MD or OD.

The embodiment utilizing the trapezoidal bridged design with surrounding wing structure, is shown 3B. A schematic illustration of the bridge itself is shown in FIG. 5. This design not only meets all of the same objects as the embodiment merely utilizing the bridged design discussed above (e.g. a stable flying height), but, in addition, it provides a uniform DFH efficiency across the entire surface of the disk, as can be seen graphically in FIG. 6.

BRIEF DESCRIPTION OF THE DRAWINGS

The objects, features, and advantages of the present invention are understood within the context of the Description of the Preferred Embodiment as set forth below. The Description of the Preferred Embodiment is understood within the context of the accompanying figures, wherein:

FIG. 1 is a schematic side cross-sectional view of a prior art DFH slider-mounted read/write head in operation within a hard disk drive (HDD).

FIG. 2 is a schematic 3-D illustration of a prior art DFH slider showing exemplary topography of the ABS.

DESCRIPTION OF THE PREFERRED EMBODIMENTS

Figure 3A:
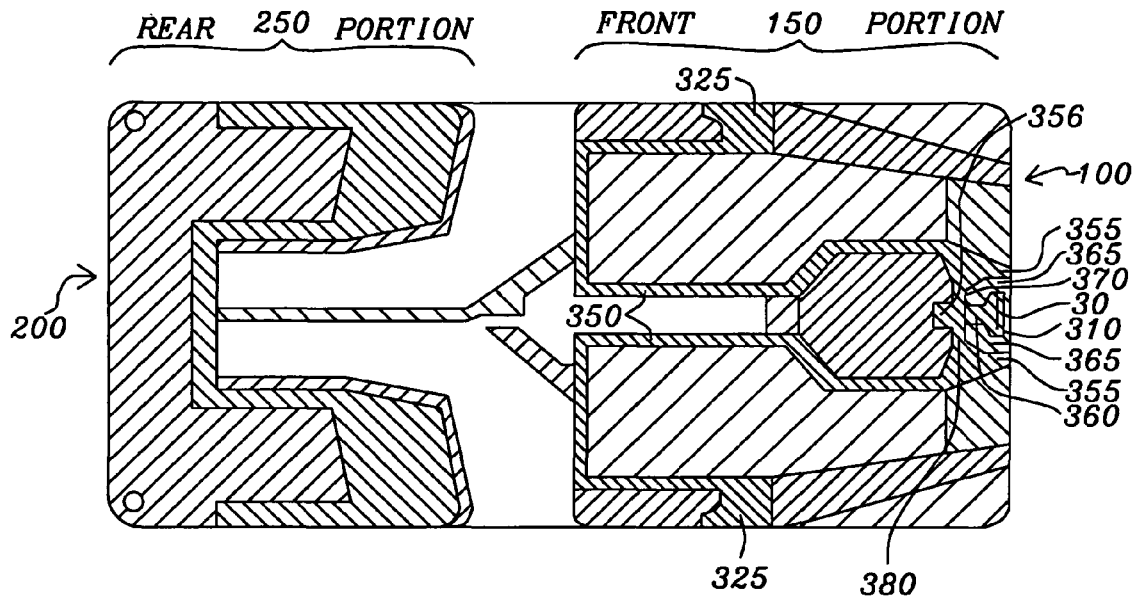
FIG. 3A is a schematic planar illustration of an air bearing surface (ABS) structure of a slider according to an embodiment of the present invention having a bridged micro-pad.

Referring first to FIG. 3A, there is shown a schematic drawing of a plane view of the ABS of the slider of a first embodiment of the present invention from a perspective obtained by looking up at the ABS from an adjacent disk surface. In this embodiment the read/write head and adjacent embedded heater elements are placed in a micro pad of small surface area that is connected by a bridge of substantially rectangular shape to a winged structure that is to the leading edge side of the micro-pad. In both FIG. 3A and FIG. 3B, the relative heights of the topographical features and structures defining the ABS will be distinguished by their degree of shading. Thus the more darkly shaded regions represent the upper surfaces that are "highest," meaning they are closest to the ABS plane and closest to the disk surface. The less intensely shaded regions are the "deepest," representing grooves and channels for encouraging desirable airflow patterns.

Referring again to FIG. 3A, the trailing edge of the slider is indicated by an arrow as (100) and the leading edge is denoted by (200). The ABS of the slider is divided into two substantially separated portions, a trailing ABS portion (150) and a leading ABS portion (250). For simplicity of reference, the trailing edge portion of the slider will be called the front portion of the slider, and the leading edge portion will be called the rear portion of the slider. The rear portion of the slider is bounded by the leading edge of the slider (200) and the front portion is bounded by the trailing edge (100). The front portion includes two parallel side rails (325) and a divided central rail (350). These structures are separated from each other by deep airflow channels (320) that help provide a stable aerodynamic performance of the slider. The vertically "highest" surfaces as given by the planar perspective (height being measured in the direction towards the disk surface) of these structures form the ABS plane of the slider and are represented by the densest shading. Areas with lighter shading are the deeper areas.

The read/write head (30), shown as a short line parallel to the front edge of the slider, and adjacent but below-surface heating DFH elements (not shown) are both embedded within a micro-pad (310) formed at the front edge of the central rail (350), which forms a front edge of a transverse portion (380) of the central rail. Note that use of the term "front" when referring to structure edges will refer to the right-hand-side of structures in the drawing. The micro-pad is connected to the trailing or "front" edge perimeter (370) of the transverse portion (380) of the central rail structure by a bridge (360) of substantially rectangular shape. The bridge lies along a central line of symmetry of the slider and connects the rear edge of the micro-pad to the front edge perimeter (370) of the central rail. The lateral edges of the front edge perimeter of the central rail project outward (towards the front of the slider) in the form of two wings (355), substantially symmetrically placed about a center line of the central rail, which two wings substantially surround the micro-pad (310). A small projection (356), that serves to control the air flow, extends rearward from the rear edge of the transverse portion of the central rail. It is found that the length of this rearward extending projection can be used to control the uniformity of the flying height across the disk. A partial trench (365) separates the micro-pad somewhat from the winged projections, but the bridge (360) breaks the continuity of the trench. As can be seen in the figure, the extension and shape of the wings produces a concavity within the trailing edge perimeter of the central rail. The micro-pad fits within this concavity and has a lateral dimension (measured perpendicularly to the trailing edge direction) denoted as $l_{mp}$ and a width dimension, denoted as $w_{mp}$, (measured along the trailing edge direction) and is laterally surrounded by the wings.

The trench (365) of width dimension denoted $w_t$ separates the micro-pad from the wings and partially from the remainder of the concave perimeter, but the micro-pad is physically connected to the transverse portion (380) of the central rail by the bridge (360). In this preferred embodiment, the width of the micro-pad, $w_{mp}$ is between approximately 40 and 60 microns and the length, $l_{mp}$, is approximately 30 microns. The width of the bridge, $w_{br}$, is approximately 20 microns and the width of the trench, $w_{tr}$, is approximately 15 microns. The depth of the trench $d_t$ is preferably between approximately 0.3 and 3 microns. It is also seen that the central rail has additional topological features, such as a shallow central groove between its symmetrically placed edges (350), that produce a desirable airflow past the micro-pad during slider operation. Although the shapes and dimensions of these shallow grooves can be adjusted to optimize aerodynamic characteristics, it is the micro-pad, bridge, surrounding wings and trench that produce the performance that satisfies the objects of the invention.

By embedding the heater element and the read/write head in this small, bridged micro-pad, the air pressure on the sensor area is maintained in a stable manner during HDD operation. However, because of the shape of the bridge, the DFH efficiency is not yet uniform over the entire surface of the disk.

Figure 4:
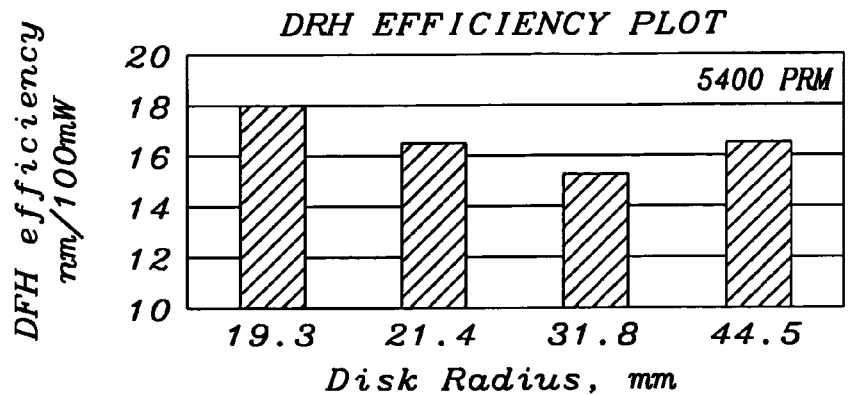
FIG. 4 is a graphical representation showing the non-uniform variation of DFH efficiency as a function of radius across the surface of a disk for the slider of FIG. 4A.

Referring now to FIG. 4, there is shown a graphical representation of the value of the DFH efficiency as a function of disk radius. As can be seen, the efficiency is maximally 18 nm/100 mW at an inner radius value of 19.3 mm of the disk, it then decreases smoothly to a value of approximately 15 nm/100 mW at 31.8 mm radius and finally rises once again to a value of approximately 16.5 nm/100 mW at the outer radius value of 44.5 mm.

Figure 3B:
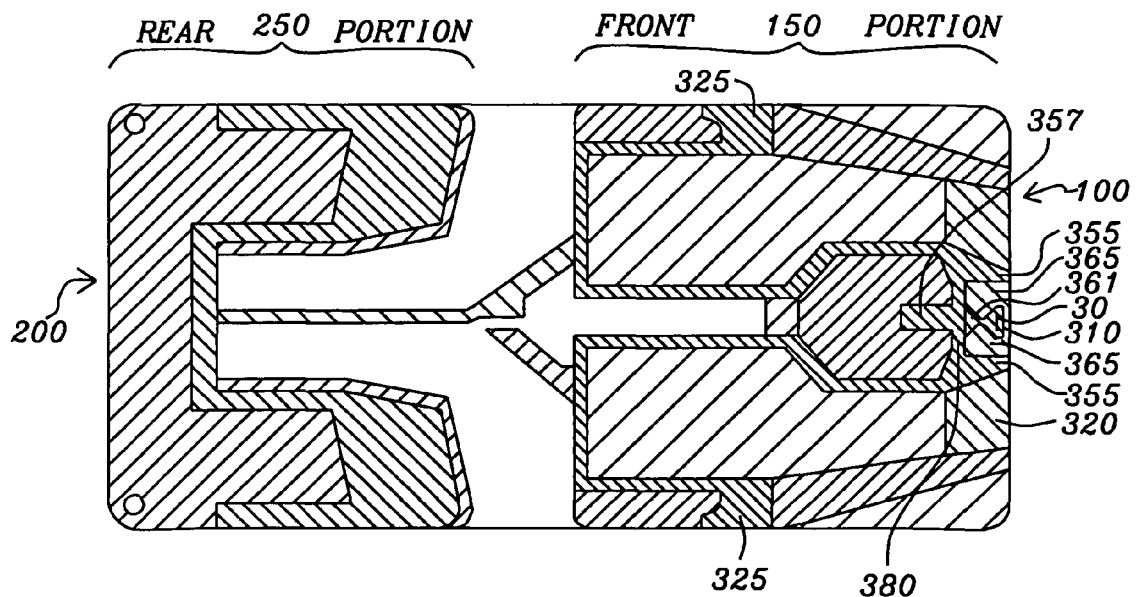
FIG. 3B is a schematic planar illustration of an air bearing surface (ABS) structure of a slider according to an embodiment of the present invention having a bridged micro-pad with a trapezoidal bridge shape.

Referring now back to FIG. 3B, there is shown another embodiment of the present invention that is similar in many respects to the embodiment of FIG. 3A except for the trapezoidal shape of the bridge (361) between the micro-pad and the transverse portion (380) of the central rail. In particular, the width and length dimensions of the micro-pad, the width and depth of the trench and the width of the bridge are substantially the same as those given for the previous figure. This bridge and its effects on the pressure distribution on the slider ABS due to air flow will be illustrated in FIG. 5. The various topological features of the embodiment of FIG. 3B are numbered identically to FIG. 3A, except that the trapezoidal bridge is numbered (361) to indicate the distinction between it and the rectangular bridge numbered (360) in FIG. 3A. The small projecting ridge (357) in this design is also somewhat longer than the similar ridge denoted (356) in FIG. 3A, the extra length contributing to a lowered flying height in the middle zone of the disk.

Figure 5:
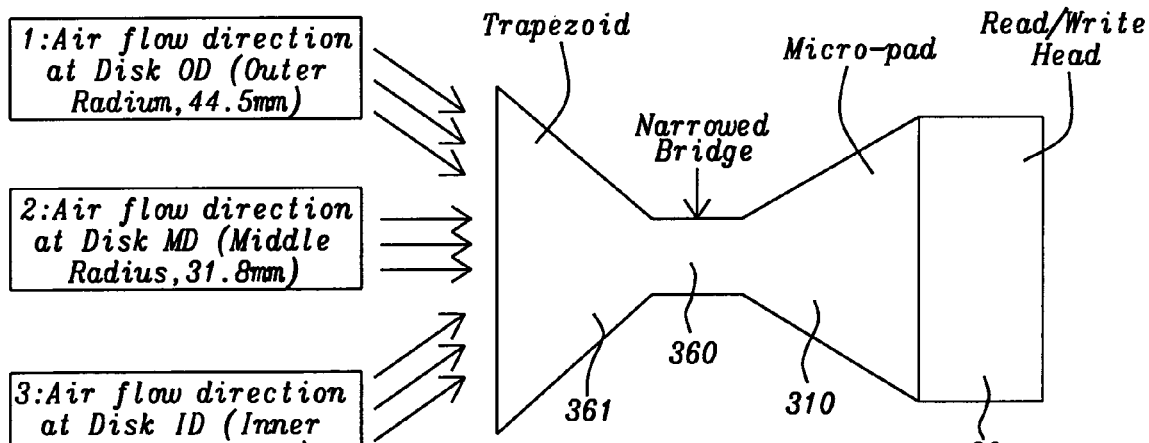
FIG. 5 is a schematic illustration of the trapezoidally bridged micro-pad of the slider in FIG. 4B, showing the direction of air flow impinging on the sensor as a function of position over the disk surface.

Referring now to FIG. 5, there is shown an enlarged schematic drawing of the micro-pad (310) and trapezoidal bridge that connects it to the central rail in FIG. 3B. The bridge portion (360) is seen to be a narrow central segment that projects rearward from the micro-pad (310) and that then flares out to form a trapezoidal portion (361) that is connected to the transverse portion of the central rail (not shown here) as discussed above. The read/write head (30) is also schematically indicated. The efficacy of this bridge shape in providing a uniform DFH efficiency across the surface of the disk is a result of the fact that even as the air flow pattern changes direction relative to the slider ABS as the slider moves across the disk, the position of the pressure point on the slider does not change and the pressure remains uniform. As noted in the figure legends and the associated arrows, at the outer and inner radii of the disk, the air flow changes direction relative to its direction at the approximate center of the disk. In addition, as previously noted, the rearward extending projection ((357) in FIG. 3B) produces a uniformly low flying height in the disk MD (middle) region.

Figure 6:
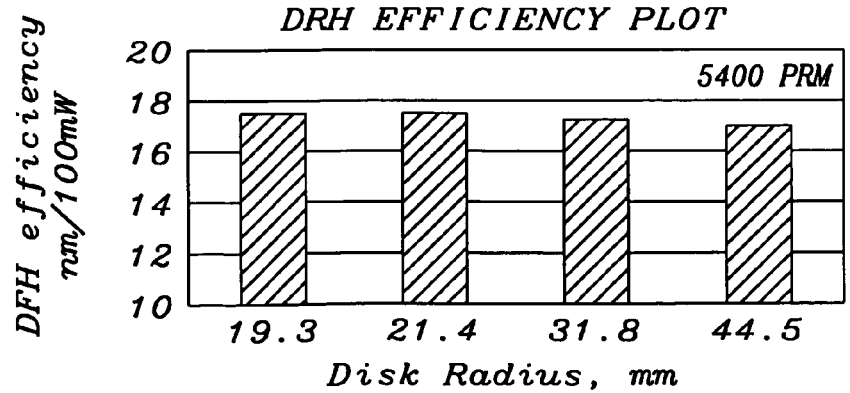
FIG. 6 is a graphical representation showing the uniform variation of DFH efficiency as a function of radius across the surface of a disk for the slider of FIG. 3B.

Referring now to FIG. 6, there is shown a schematic graphical indication of the values of DFH efficiency measured along the disk radius for the design of FIG. 3B. As can be seen, The DFH efficiency for this design is a uniform value of approximately 17.5 nm/100 mW across the surface of the disk. It is further noted that the across-the-disk uniformity of the DFH efficiency of this design has an important corollary effect in that it allows a uniform and reproducible calibration of the amount of heater power needed to avoid unwanted touchdowns of the read/write head. This uniformity, in turn, allows a greater reliability of drive operation over a statistical distribution of drives.

As is understood by a person skilled in the art, the preferred embodiments of the present invention are illustrative of the present invention rather than being limiting of the present invention. Revisions and modifications may be made to methods, processes, materials, structures, and dimensions through which is formed a DFH type slider having controlled DFH efficiency that is uniform across the surface of a disk and minimal flying height variations during HDD operation, while still providing such a DFH type slider, formed in accord with the present invention as defined by the appended claims.

What is claimed is:

1. A DFH slider having a high and uniform DFH efficiency across the surface of a rotating disk and reduced sensitivity of its operational flying height to disk surface irregularities and environmental conditions, said slider comprising:

an ABS topology, including separated front and rear portions, wherein said front portion further includes a pair of laterally disposed parallel side rails, a topologically patterned divided center rail formed substantially midway between said side rails and parallel to said side rails and airflow channels formed within said central rail and between said center rail and said side rails; wherein a front edge of a transverse portion of said center rail includes a pair of laterally disposed wing-like projections symmetrically disposed about a center line of said transverse portion, thereby forming a concavity within a front edge perimeter of said center rail and wherein a rearward directed extension projects from a rear edge of said transverse portion and wherein a micro-pad is formed within said concavity, said micro-pad having a width dimension, $w_{mp}$ and a lateral dimension $l_{mp}$ and said micro-pad is surrounded laterally by said wing-like projections and said micro-pad is partially separated from said central rail front edge perimeter by a trench having a width $w_t$ and depth $d_t$, and wherein a bridge structure is formed along said center line connecting said micro-pad to said transverse portion of said central rail; and a read/write head and DFH heating element is embedded within said micro-pad, said heater being capable of providing a thermally induced protrusion of said micro-pad with a uniform and diminished pushback effect.

2. The slider of claim 1 wherein said bridge structure is a trapezoidally shaped bridge that includes a narrow middle section of uniform width that extends from the rear edge of said micro-pad and then flares out to form a trapezoidal section that connects to the front edge of said transverse portion of said central rail.

3. The slider of claim 1 wherein said micro-pad provides a short pressure length and a corresponding reduced pressure at said read/write head, thereby diminishing a heater-induced pushback effect during slider operation.

4. The slider of claim 2 wherein the trapezoidal shape of said bridge allows a uniform pressure to be exerted on the slider even as the angle of air flow relative to the slider position along a disk radius changes.

5. The slider of claim 1 wherein the topological patterning of said center rail divides an air flow around said micro-pad, thereby further diminishing said pushback effect and providing aerodynamic stability during slider operation.

6. The slider of claim 2 wherein said reduced and uniform pressure and reduced and uniform pushback produced by the trapezoidal bridge allows a greater reduction of flying height for a given heater power level, thereby lowering power consumption and lengthening the lifetime of the read/write head.

7. The slider of claim 2 wherein reduced and uniform pressure and reduced and uniform pushback produced by the trapezoidal bridge renders the slider less sensitive to flying height variations caused by variations in a disk surface.

8. The slider of claim 2 wherein reduced and uniform pressure and reduced and uniform pushback produces a uniform DFH efficiency across a disk surface.

9. The slider of claim 2 wherein a uniform micro-pad protrusion across the surface of a disk of between approximately 16 nm and 18 nm at a heater power of approximately 100 mW can be obtained with a micro-pad of width dimension between approximately 40 and 60 microns, a length dimension of approximately 30 microns, and a bridge of width dimension of approximately 20 microns.

10. The slider of claim 1 wherein the lateral dimension, $l_{mp}$, and width dimension, $w_{mp}$, of said micro-pad are each between approximately 40 and 60 microns.

11. The slider of claim 1 wherein the width dimension of the trench, $w_t$, is approximately 15 microns.

12. The slider of claim 1 wherein the length of said rearward directed extension projecting from said rear edge of said transverse portion can be used to control the uniformity of slider flying height across a middle portion of said rotating disk.

* * * * *